US012176133B2

(12) United States Patent
Hundt et al.

(10) Patent No.: US 12,176,133 B2
(45) Date of Patent: Dec. 24, 2024

(54) INDUCTIVE COMPONENT AND METHOD FOR PRODUCING THE SAME

(71) Applicant: Vacuumschmelze GmbH & Co. KG, Hanau (DE)

(72) Inventors: Harald Hundt, Dieburg (DE); Bjoern Stuwe, Linsengericht (DE); Johannes Beichler, Eppertshausen (DE); Klemens Trabold, Elsenfeld (DE)

(73) Assignee: Vacuumschmelze GmbH & Co. KG, Hanau (DE)

(*) Notice: Subject to any disclaimer, the term of this patent is extended or adjusted under 35 U.S.C. 154(b) by 797 days.

(21) Appl. No.: 17/059,893

(22) PCT Filed: May 28, 2019

(86) PCT No.: PCT/EP2019/063805
§ 371 (c)(1),
(2) Date: Nov. 30, 2020

(87) PCT Pub. No.: WO2019/229054
PCT Pub. Date: Dec. 5, 2019

(65) Prior Publication Data
US 2021/0217550 A1 Jul. 15, 2021

(30) Foreign Application Priority Data
May 30, 2018 (DE) ..................... 10 2018 112 975.0

(51) Int. Cl.
*H01F 17/06* (2006.01)
*H01F 1/153* (2006.01)
(Continued)

(52) U.S. Cl.
CPC ....... *H01F 17/062* (2013.01); *H01F 1/15333* (2013.01); *H01F 27/2895* (2013.01);
(Continued)

(58) Field of Classification Search
CPC ............... H01F 17/062; H01F 1/15333; H01F 27/2895; H01F 27/303; H01F 27/306; H01F 41/08; H01F 27/25
See application file for complete search history.

(56) References Cited

U.S. PATENT DOCUMENTS 2,765,448 A * 10/1956 Duffing ................. H01F 38/023
336/229
2010/0253459 A1 10/2010 Zimmerman
(Continued)

FOREIGN PATENT DOCUMENTS

DE 8016996 U1 9/1980
DE 3832659 A1 4/1989
(Continued)

OTHER PUBLICATIONS

International Search Report and Written Report regarding PCT/EP2019/063805 dated Aug. 29, 2019.

*Primary Examiner* — Tuyen T Nguyen
(74) *Attorney, Agent, or Firm* — Dickinson Wright PLLC

(57) ABSTRACT

An inductive component, which has an annular core having a core cross section and made of a soft-magnetic material and a coil surrounding the core is provided. The coil is composed of two electrically conductive sections. The sections each have a basic U shape with two limbs, of which the first limb is longer than the second limb and the first limb is curved and towards the end of same projects away from a plane defined by the basic U shape. The sections are pushed onto the core next to one another so that the basic U shape of each section surrounds the core cross section on three sides. The first limb of a section is mechanically and electrically connected to the second limb of the other section. A method for producing a component of this kind is also described.

17 Claims, 3 Drawing Sheets

(51) Int. Cl.
*H01F 27/28* (2006.01)
*H01F 27/30* (2006.01)
*H01F 41/08* (2006.01)

(52) U.S. Cl.
CPC ......... *H01F 27/303* (2013.01); *H01F 27/306* (2013.01); *H01F 41/08* (2013.01)

(56) References Cited

U.S. PATENT DOCUMENTS

| | | | | |
|---|---|---|---|---|
| 2012/0326820 | A1 | 12/2012 | Yu | |
| 2017/0256354 | A1 | 9/2017 | Feng | |
| 2018/0308625 | A1* | 10/2018 | Hasegawa | H01L 28/10 |
| 2018/0350501 | A1 | 12/2018 | Hasegawa | |
| 2021/0090788 | A1* | 3/2021 | Hasegawa | H01F 27/292 |

FOREIGN PATENT DOCUMENTS

| | | | |
|---|---|---|---|
| DE | 102004001255 | A1 | 8/2005 |
| DE | 102016210746 | A1 | 12/2017 |
| DE | 102009046570 | A1 | 5/2019 |
| EP | 3214750 | A1 | 9/2017 |
| WO | 2015158200 | A1 | 10/2015 |
| WO | 2017141838 | A1 | 8/2017 |

* cited by examiner

INDUCTIVE COMPONENT AND METHOD FOR PRODUCING THE SAME

This U.S. national stage patent application claims priority to international patent application no. PCT/EP2019/063805, filed May 28, 2019, which claims priority to German patent application DE 10 2018 112 975.0, filed on May 30, 2018, the entire contents of which are incorporated herein by reference for all purposes.

TECHNICAL FIELD

This disclosure relates to an inductive component and a method for its production.

RELATED ART

During production of inductive components comprising annular cores and thick wire coils, a high degree of mechanical stress is exerted on the annular core by the coil tension that arises during winding. In order to achieve a close-fitted application of the wires, the wire has to be pulled tightly when it is drawn through the annular core. The forces arising from this are generally absorbed by the edges of the annular core. Therefore, either the annular core itself or the housing surrounding it must be durable enough to prevent the annular core from being damaged or otherwise functionally compromised. Due to the fact that, in numerous areas of use, annular cores are required to have as little volume as possible and be highly permeable, the core material must be protected from applied forces that could affect the magnetostriction. Accordingly, the housing or other enclosure should be self-supporting in order to be able to absorb the forces arising during the winding without deformation and without passing the forces on to the annular core.

Problems arise, however, when annular cores with thicker wires and standard housings are to be wound, for example, for use with stronger currents. In the case of commonplace annular core housings made of plastic that generally have a wall thickness of 1-2 mm, the winding options that standard winding techniques afford do not extend beyond a wire diameter of 2-3 mm, when copper wire is used. In order to be able to use wires of greater strength, housings made of much more durable plastic materials may be deployed or multi-conductor cables, such as high-frequency cables, may be used for coil. More durable housings can stand up to higher tension forces, but they also tend to increase production costs and the housing volume. Multi-conductor cables may improve the distribution of tension force, but they also come with some disadvantages such as, for example, impaired behavior at high frequencies caused by the higher capacities between the windings, as well as increased costs for the wire cables and connection accessories.

SUMMARY

For the above reasons, there is a need for inductive components that employ sensitive magnetic materials while still being compatible with the presently available plastic housings and their given stability, as well as for a manufacturing method for producing such annular cores.

An inductive component is disclosed comprising a ring-shaped core made of soft magnetic material and which has a cross-section, as well as a coil that surrounds the core and that is composed of two electrically conductive sections. Each of the sections has the basic shape of a U with two limbs, of which the first limb is longer than the second limb, the first limb is curved, and the end of the first limb projects away from a plane defined by the basic U shape. The sections are fitted, next to each other, on the core such that each of the basic U shape of each section surrounds the cross-section of the core on three sides. The first limb of a section is mechanically and electrically connected to the second limb of the other section.

In addition, a method for manufacturing an inductive component is disclosed, by means of which two electrically conductive sections are fitted, next to each other, onto a ring-shaped core made of soft magnetic material and with a specific cross-section, forming a coil and such that the basic U shape of each section surrounds the cross-section of the core on three sides. Each of the sections has the basic shape of a U with two limbs, of which the first limb is longer than the second limb, the first limb is curved, and the end of the first limb projects away from a plane defined by the basic U shape. The first limb of a section is mechanically and electrically connected to the second limb of the other section.

BRIEF DESCRIPTION OF THE DRAWINGS

Various embodiments will now be described in detail with reference to the embodiments illustrated in the figures. Similar or identical elements are designated with the same reference signs.

DETAILED DESCRIPTION OF EXAMPLE EMBODIMENTS

Figure 1:
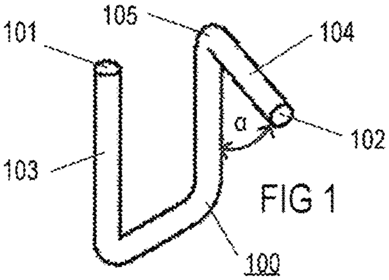
FIG. 1 shows a three-dimensional view of an exemplary section intended for use in a coil composed of two or more such sections.

As envisaged, one or more windings are assembled using curved conductor sections. These windings are fitted onto or over a ring-shaped, soft magnetic core, which generally hereinafter will be more concisely referred to as "annular core" or simply "core", and are then electrically and mechanically connected to each other to form a coil using suitable connection means. The conductor sections can be formed, for example, as basically U-shaped or UI-shaped brackets, wherein the type of conductor sections employed, as well as the manner of their employment, depends in each individual case on the three-dimensional structure and number of connection points. Thus the disclosed connection technology can be implemented at a low cost when, for example, only a very limited number of connection points are provided for and when these connection points lie on the outer periphery of the annular core. If the objective is to have as few connection points as possible in each coil or, more precisely, exactly one connection point per winding, then this objective can be achieved, for example, by employing the U-shaped bracket with a curvature formed after fitting. This bending step, however, is usually carried out over the edge of the annular core and would generally be expected to subject the annular core to excessively high tension forces. In order to avoid this, a specially formed conductor bracket is deployed which, after being fitted on the annular core, is brought, if needed, into the position of a winding by means of an essentially tension-free rotation. The annular core may comprise, for example, amorphous or nanocrystalline material and is shaped either in the form of a tape, for example, or consists entirely thereof. The band may have a permeability, for example, of between 200 and 150000.

The option of using as few differently formed wire brackets as possible, meaning keeping the number of different bracket forms to a minimum, brings significant economic savings. The means of connection used is also of great significance, however, as single insufficiently stable connection is enough to render an entire coil unreliable and can result in the malfunctioning or failure of the entire component. Every connection comprises a combination of mechanical functionality—the stable and secure positioning of the conductors—as well as electrical functionality—establishing and maintaining a permanent low-ohmic electrical contact. The goal here is to provide an electrical connection in which the mechanical and electrical functionalities can be regulated, for the most part independently of each other. This goal is achieved, for example, by inserting the correspondingly formed ends of adjacent brackets into each other, which already suffices to establish a certain mechanical connection without the need, for example, of subsequent soldering or welding. For example, a number N of brackets inserted into each other, each of which forms one winding, are assembled to form one continuous coil consisting of N number of windings.

FIG. 1 shows a three-dimensional view of an example of such individual brackets 100, roughly U-shaped and comprising two end parts 101 and 102 at the ends of the U-shaped brackets two limbs 103 and 104. For the sake of simplicity, no specific embodiment of the one or the other end part 101 and 102 is illustrated. The U-shaped bracket may be rectangular or rounded or have any other design. Shown here is a more rectangular bracket form with rounded corners. The limb 104 of the U-shaped bracket is longer than the other limb 103 and, approximately at the height of the end part 101, that is, approximately in the middle of the limb 104, curved away from the end part 101 such that two definite angles α, β are formed in relation to the plane defined by the limbs. One or both of the angles α, β may have, for example, exactly or approximately 90 degrees (±45 degrees) such as, for example, between and including 80 degrees and 100 degrees.

Figure 2:
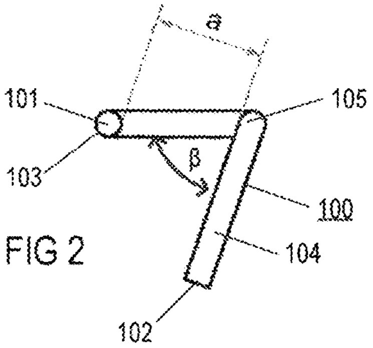
FIG. 2 shows a plan view of the section shown in FIG. 1.

FIG. 2 shows a plan view of the bracket 100. As can be seen, the two limbs 103 and 104 are arranged at a distance a to each other. The distance a between the limbs, and thus the opening of the U-shape, is dimensioned to permit the opening of the bracket 100 to be fitted over the annular core, which has a width designated as b.

Figure 3:
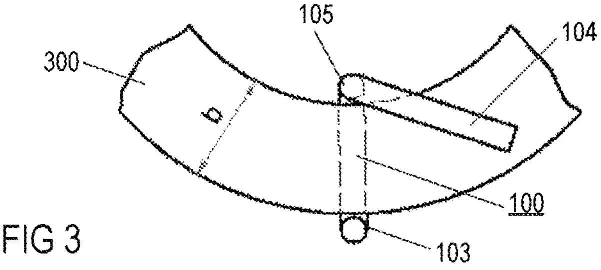
FIG. 3 shows a plan view of the section shown in FIG. 1 after it has been fitted on an annular core.

In FIG. 3 the bracket 100 is shown after having been fitted over an annular core 300 that has a width of b. The length of the limbs 103 and 104 depends, possibly among other aspects, on the height (not shown in FIG. 3 but designated in FIG. 4 as height h) of the annular core 300.

Figure 4:
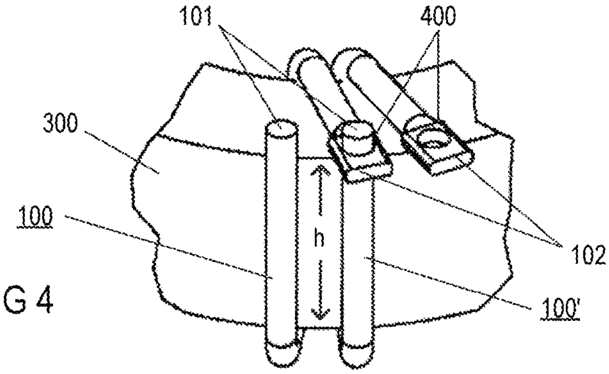
FIG. 4 shows a three-dimensional view of the section shown in FIG. 1 and of a further section, after they have been fitted on the annular core and connected to each other.

FIG. 4 shows, in a three-dimensional illustration, a case in which the bracket 100 and a further identical bracket 100' have been fitted on the annular core 300 and connected to each other. In the embodiment shown here, one end part 101 of each of the brackets 100 and 100' is implemented in the form of a rounded rod, whereas the other end 102 of each bracket 100 and 100' is pressed flat. A (through) opening 400 is provided in the flattened part that complements the rounded rod of the end part 101 with regard to shape and dimensions, meaning that the complementary parts correspond to, i.e. fit into each other. To connect the brackets, one end part 101 of the bracket 100, after having been fitted on the annular core 300, the end segment of the limb 104 is rotated (with rotational elastic or non-elastic deformation) around the other section of the limb 104 in the region of its middle curvature, and the end part 101 of the bracket 100 is inserted into the opening 400 of the other bracket 100', which has also been fitted on the annular core 300.

The fitting of the brackets can be carried out as follows; first the end segment of the limb 104 is completely inserted into the inner opening of the annular core 300 in the direction of the height h of the annular core 300, during which the segment of the bracket 100 that connects the limbs extends in the radial direction of the annular core 300. The bracket is then tilted around the longitudinal axis of this segment and is arranged inclined towards the width b of the annular core 300.

Figure 5:
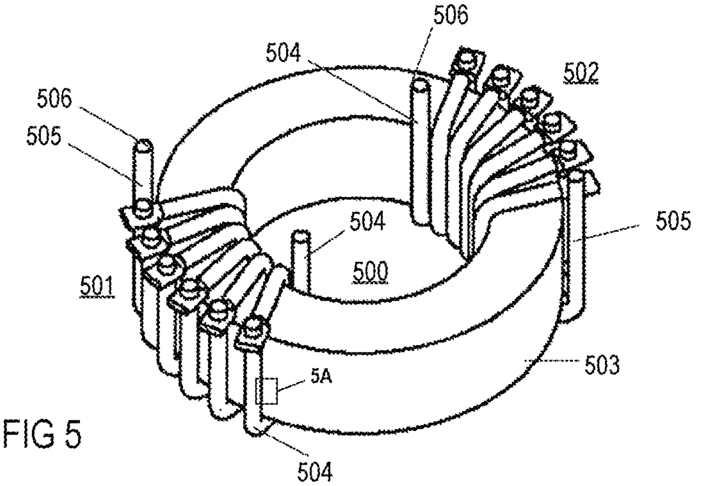
FIG. 5 shows a three-dimensional view of an exemplary common-mode interference suppression choke with two coils composed of sections on an annular core.
Figure 5A:
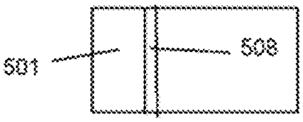
FIG. 5A shows an electrically insulating coating encasing a portion of one of the coils of FIG. 5.

By adding further brackets and bending the brackets—as explained above with reference to FIG. 4—a uniform chain consisting of numerous interconnected brackets is formed, producing one or more windings. FIG. 5 shows, as one example, a current compensated choke, that is, a common-mode interference suppression choke 500 (or another inductive component such as, for example, a transformer, choke, etc.) that has two (identical) coils 501 and 502, assembled in the manner described above, on an annular core 503. FIG. 5A shows an electrically insulating coating 508 encasing a portion of the coil 501 of FIG. 5. As an option, special end brackets 504 and 505 can be used, each of which can be fitted as the first or last bracket of a winding and each of which comprises an elongated (and, if desired, specially formed) end part 506, which serves to facilitate the electrical contact. For example, the elongated rounded-rod end parts 506 can easily be inserted into the bores of a printed circuit board and there soldered, welded or clamped to the conductor tracks of the circuit board. All of the connections between the individual brackets are on the outside of the annular core and thus easily accessible during manufacture, testing and repair of the component. The common-mode interference suppression choke 500 may have more than two coils which, in this case, may be arranged on 4 segments of the annular core instead of two. The annular core encompasses an inner circumference and the sections within the inner circumference may be shaped to conform to the circular segments in order to achieve, for example, a tighter winding.

Figure 6:
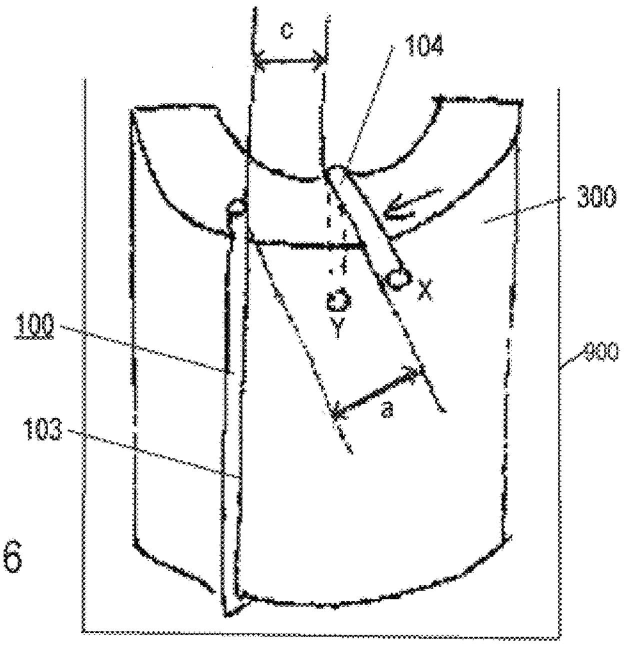
FIG. 6 shows a three-dimensional view of an alternative embodiment of the section shown in FIG. 3 on an annular core, aimed at achieving a reduced space between windings.

In accordance with the further embodiment shown in FIG. 6, the embodiment shown in FIG. 3 can also be modified by making the opening in the U-shape of the bracket, that is, the clear distance between the two limbs 103 and 104, larger than the subsequent distance between the windings. To this end, after the bracket 100 has been fitted onto the annular core 300, the end part of the longer limb 104, for example, can be rotationally bent from a position X into a position Y such that a distance c between the windings is created that is smaller than the distance a, thereby also reducing the sector of a wound segment (or analogously, the pitch of the winding). Although a (non-elastic) bending of the bracket is required here, this is carried out by means of a rotational movement of the wire that runs laterally to the annual core (for example, within the inner opening of the annular core), and thus exerts no significant tension on the annular core while being performed.

In all of the previously described embodiments, as well as in all conceivable alternative embodiments, the electrical connection of the bracket ends, for example, of the bracket end parts 101 and 101' shown in FIG. 4, can be realized using any suitable method such as, for example, resistance welding, laser welding, soldering, brazing, crimping, press-fitting, or with the aid of electrically conductive adhesive bonding or by any combination of these means and an existing contact (produced, for example, by press-fitting) can be improved. The connections between the brackets are easy to produce thanks to their exposed, easily accessible location on the outer periphery of the core. This also greatly facilitates visual inspection and renders the measurement of the electrical properties of each individual bracket much easier to monitor.

Figures 7, 8, 9, 10:
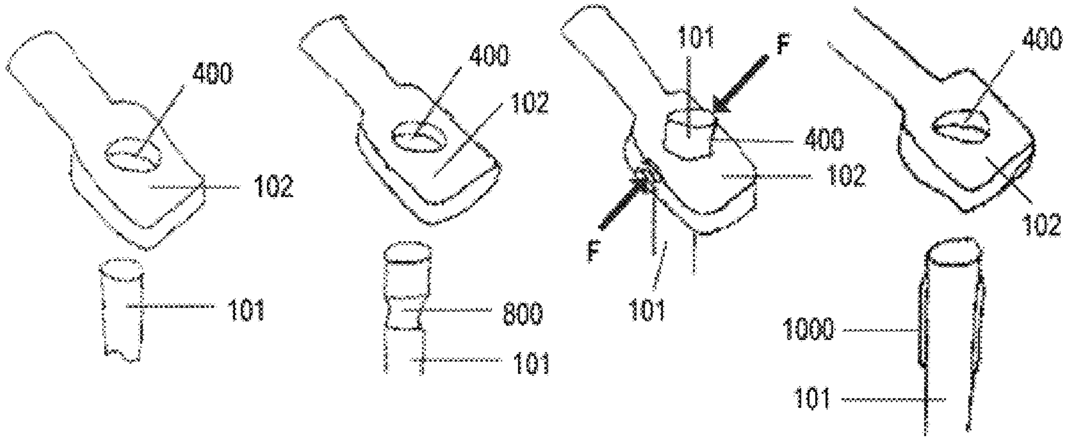
FIG. 7 shows a three-dimensional view of an exemplary implementation of the section ends before being connected.
FIG. 8 shows a three-dimensional view of an alternative implementation of the section ends before being connected.
FIG. 9 shows a three-dimensional view of the section ends illustrated in FIG. 7 after being connected.
FIG. 10 shows a three-dimensional view of further alternative implementation of the section ends before being connected.

FIG. 7 shows a detailed view of the connection technology that can be employed, for example, in the arrangement illustrated in FIG. 4, before being connected, that is, inserted into each other. The end part 101 of the bracket 100 (not shown in its entirety in FIG. 7) is again implemented in the form of a rounded rod; whereas the corresponding other end 102 of the bracket 100' (also not shown in its entirety in FIG. 7) has been pressed flat. In the flattened surface a (through) opening 400 has been introduced which is complementary in form and dimensions to the rounded rod of the end part 101. The end part 101 of the bracket 100 is to be inserted, vertically in relation to the flattened surface of the end part 101', into and through its opening 400 (and, if needed, press-fitted). In an assembled state (as shown in FIG. 4), one end segment of the rounded-rod end part 101 extends through and beyond the opening 400 of the flattened end part 102, thereby forming a heat sink, as this segment is not electrically conductive and is therefore not warmed up by the current itself, allowing it to absorb and dissipate warmth from adjacent parts through which a current does flow. This serves to (indirectly) cool the point of connection, which as a result will always have a lower temperature than the other segments of the respective bracket or winding.

FIG. 8 shows a further embodiment in which the rounded-rod end part 101 has a recess or a taper 800 which, when pressed through the opening 400, produces a form-fitted connection that mechanically fixes the brackets to each other, securing them in place for a possible subsequent (additional) joining process such as, for example, welding or soldering. FIG. 9 shows the two end parts 101 and 102, which were shown individually in FIG. 8, after having been joined together. In a next step, pressure F is applied to both sides of the end part 102 to press the parts together and form a non-elastic curvature. This approach also makes it possible to employ an alternative connection technology such as soldering. After all of the brackets have been mechanically connected in the manner described above, as well as (sufficiently) electrically connected by means of the press-fitting, a suitable, high electric current can be fed through the entire coil, thus employing the Joule effect to heat up the brackets. Once the soldering temperature has been reached, the soldering can be carried out by applying solder to the points of contact. In cases in which the solder is applied as a paste to all points of contact, all of the connections can be soldered simultaneously by means of a single current impulse of a given duration.

FIG. 10 shows an embodiment in which, in place of the recess or taper 800 shown in FIG. 8, an elevation or a thickening 1000 is formed on the end part 101. The press-fit is in this case already produced when the end parts 101 and 102 are fitted together. The connection technology that can be employed here is essentially the same as that described above.

Figure 11:
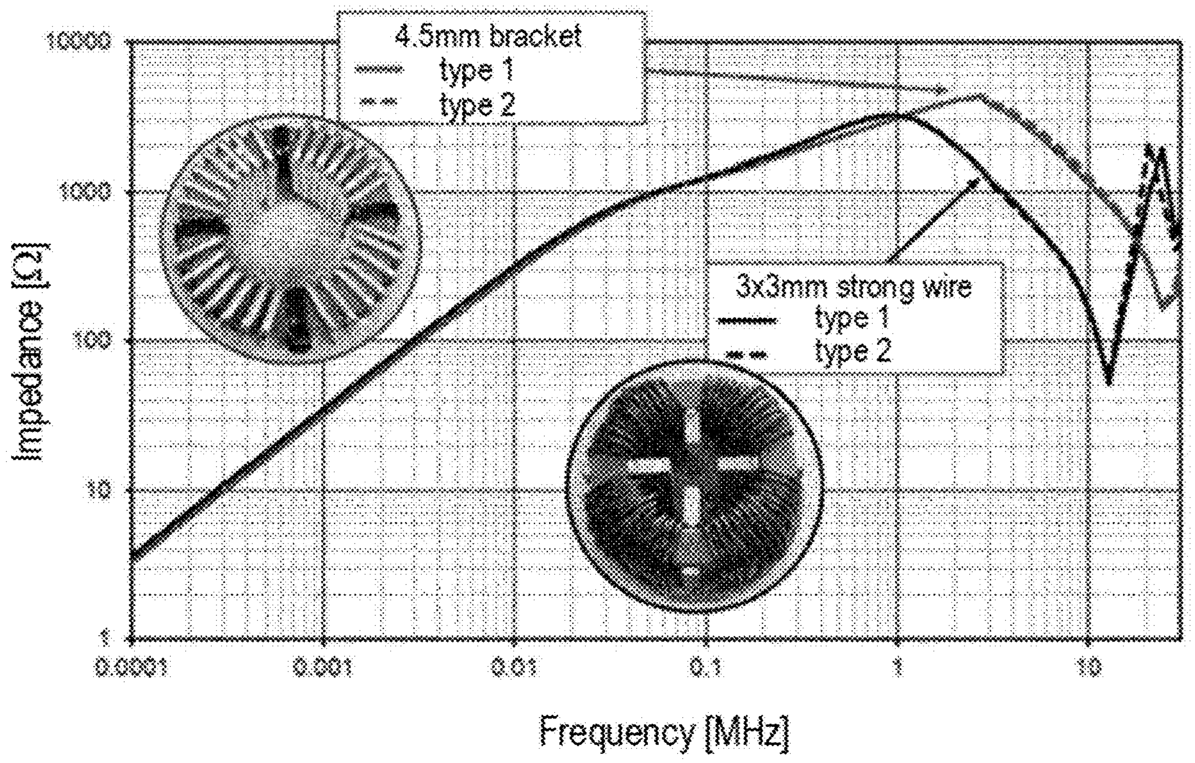
FIG. 11 shows in an impedance/frequency diagram the comparison of measurements taken of a common-mode interference suppression choke composed of thick wires with those taken of a common-mode interference suppression choke composed of the sections described here.

Comparative measurements have been carried out on various types of common-mode interference suppression chokes, the results of which can be viewed in FIG. 11. Two types of chokes that employ the "bracket technology" described above were compared, on the one hand, with two similar types of conventional chokes that employ "thick-wire technology" with triple parallel strands, on the other. The measurements showed that the impedance over frequency curve of the bracket technology exhibited a resonant frequency (impedance drop) at higher frequencies than the impedance over frequency curves of conventional thick-wire technology. Suppression of a common-mode interference signal of up to 8-10 MHz is possible using the "thick-wire technology", for example, whereas suppression up to 15-20 MHz is possible when the "bracket technology" is employed.

Due to the increasingly high current loads being used in filter applications, coils with ever thicker wires that prevent the inductive element from overheating are coming into ever greater demand. Cores can no longer be hand-wound using a crochet hook, as it has usually been carried out in many applications, with wires that have a diameter above 3 mm, as the winding forces required exceed the capabilities of the operator. Furthermore, as the number of windings increases, so too does the hardness of the copper. Commonly used plastic troughs are no longer capable of absorbing these increasing mechanical forces and, as a result, the core may be exposed to the risk of deformation. Until now, the standard solution for this has been to provide the windings with numerous parallel strands. This, however, drastically increases the winding capacitance (Cw) and the resonant frequency shifts to the lower frequencies. Suppression above a few MHz is no longer possible in such cases. In addition to this, the use of parallel strands entails higher production costs (increased stripping time) and takes up more installation space. The technology disclosed here allows the coil to be divided into segments such as brackets, for example, that are fitted onto (or over) the core and which can then be connected to each other, for example, by means of automatic soldering.

Thus, by employing the technology described here, solid wire windings of larger diameters can be fitted onto an annular core while taking into due consideration the specific characteristics of taped annular cores made, for example, of a highly permeable material, which, as a rule, is highly sensitive to mechanical influences. Further, this technology makes it possible to continue using existing cores with their present housings for wire strengths that could not be previously used due to the tension force that their winding had, until now, exerted on the cores. FIG. 6 is an example of the housing 900 formed of a plastic material encasing the core

300. The special methods used for "winding" that are disclosed here are virtually stress and tension-free. With this, wires of any desired thickness can be utilized; the choice is theoretically only limited by the inner diameter of the core and the number of bracket segments used.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the invention.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

We claim:

1. An inductive component comprising:

a core that has a core cross section, is ring-shaped and is made of soft magnetic material, and a coil surrounding the core that is composed of two electrically conductive sections, wherein each of the sections comprises a basic U shape with two limbs, of which the first limb is longer than the second limb and the first limb is curved and, towards its end, projects away from a plane defined by the basic U shape;

the sections are fitted next to each other on the core such that the basic U shape of each section surrounds the core cross section on three sides, and the first limb of a section is mechanically and electrically connected to the second limb of another section, wherein the first limb of one of the sections and the second limb of one of the sections are insertable into each other at their ends, wherein the first limb of the one section is flattened at its end to form an upper flattened surface and a lower flattened surface parallel to the upper flattened surface, the first limb comprises an opening of a specific form extending through the flattened surfaces, and the second limb of the other section comprises a form at its end that is complementary to the specific form of the opening, so that the second limb of the other section is inserted in the opening of the first limb of the one other section.

2. The inductive component in accordance with claim 1, wherein the first limb projects towards its end at two angles away from the plane defined by the basic U shape, wherein at least one of the angles lies between 80 degrees and 100 degrees.

3. The inductive component in accordance with claim 2, wherein at least one of the two angles is at 90 degrees.

4. The inductive component in accordance with claim 1, wherein the second limb of the other section is inserted in the opening of the first limb of the one section at a right angle to the flattened surface.

5. The inductive component in accordance with claim 1, wherein the opening in the first limb of the one section is of a circular implementation and has an opening diameter, and the end of the second limb of the other one of the sections is implemented in the form of a rounded rod and has a rod diameter that is smaller than the opening diameter.

6. The inductive component in accordance with claim 5, wherein the end of the second limb of the other one of the sections is positively press-fitted in the opening of first limb of the other section.

7. The inductive component in accordance with claim 1, wherein the first limb of one of the sections and the second limb of the other one of the sections are connected to each other at their ends by at least one connection from among the group of soft soldering, hard soldering, welding and electrically conductive adhesion.

8. The inductive component in accordance with claim 1, wherein the sections are made of wire rod.

9. The inductive component in accordance with claim 8, wherein the wire rod has a diameter that lies between and including 2 mm and 50 mm.

10. The inductive component in accordance with claim 8, wherein the wire rod comprises copper or consists of copper.

11. The inductive component in accordance with claim 1, wherein the sections are at least partially encased in an electrically insulating coating.

12. The inductive component in accordance with claim 1, wherein the core comprises amorphous or nanocrystalline tape, wherein the tape has a permeability of 200 to 150000.

13. The inductive component in accordance with claim 1, wherein the core is encased in an electrically insulating housing.

14. The inductive component in accordance with claim 13, wherein the housing comprises a plastic material or is made of a plastic material.

15. The inductive component in accordance with claim 1, comprising at least one additional winding composed of sections or at least one additional section of the one winding, or both.

16. The inductive component in accordance with claim 15, wherein the first and the last section of a winding comprise a first or a second limb for externally establishing a contact.

17. An inductive component comprising:

a core that has a core cross section, is ring-shaped and is made of soft magnetic material, and a coil surrounding the core that is composed of two electrically conductive sections or more, wherein each of the sections comprises a first end and a second end;

the first end of a section is mechanically and electrically connected to the second end of another section;

the first end of one of the sections and the second end of one of the sections are implemented to be insertable into each other; and the first end of the one sections is flattened to form an upper flattened surface and a lower flattened surface parallel to the upper flattened surface, the first end comprises an opening of a specific form extending through the flattened surfaces, and the second end of the other section has a form that is complementary to the specific form of the opening, so that the second end of the other section is inserted in the opening of the first end of the one other section.

* * * * *